(12) United States Patent
Grimshaw et al.

(10) Patent No.: US 8,931,725 B2
(45) Date of Patent: Jan. 13, 2015

(54) FIBER PLACEMENT AUTO SPOOL LOADER

(75) Inventors: Michael N. Grimshaw, Milford, OH (US); Randall A. Kappesser, Cincinnati, OH (US); Milo M. Vaniglia, Cold Spring, KY (US); Denny Dettman, Rockford, IL (US); Debra Carol Dettman, legal representative, Rockford, IL (US)

(73) Assignee: Fives Machining Systems, Inc., Fond du Lac, WI (US)

( * ) Notice: Subject to any disclaimer, the term of this patent is extended or adjusted under 35 U.S.C. 154(b) by 413 days.

(21) Appl. No.: 13/402,415

(22) Filed: Feb. 22, 2012

(65) Prior Publication Data

US 2013/0056575 A1   Mar. 7, 2013

Related U.S. Application Data

(60) Provisional application No. 61/446,574, filed on Feb. 25, 2011.

(51) Int. Cl.
*B65H 67/02* (2006.01)
*B29C 70/38* (2006.01)
*B29C 31/00* (2006.01)

(52) U.S. Cl.
CPC ............... *B29C 70/38* (2013.01); *B29C 31/00* (2013.01)
USPC ............................ 242/559; 242/560; 242/131

(58) Field of Classification Search
USPC .......... 242/558, 559, 560, 594, 594.5, 594.6, 242/131, 131.1; 28/193, 201
See application file for complete search history.

(56) References Cited

U.S. PATENT DOCUMENTS

| | | | | |
|---|---|---|---|---|
| 3,854,275 | A | * | 12/1974 | Bethea et al. .................... 57/281 |
| 4,515,328 | A | * | 5/1985 | Payne, Jr. ....................... 242/131 |
| 5,218,748 | A | * | 6/1993 | Tanaka et al. .................... 28/193 |
| 7,632,372 | B2 | * | 12/2009 | Hoffmann et al. ............. 156/169 |
| 2002/0098065 | A1 | | 7/2002 | Wolf et al. |
| 2005/0247396 | A1 | | 11/2005 | Oldani et al. |

FOREIGN PATENT DOCUMENTS

| | | |
|---|---|---|
| EP | 1757434 A2 | 2/2007 |
| JP | 04213568 A * | 8/1992 |

OTHER PUBLICATIONS

European Search Report EP 12156787; dated Jun. 12, 2012; 3 pages.

* cited by examiner

*Primary Examiner* — William E Dondero
(74) *Attorney, Agent, or Firm* — Reising Ethington P.C.

(57) ABSTRACT

An apparatus for loading spools into a creel of a fiber placement machine that is used to charge a mold includes a creel loader and a spool magazine carried by the creel loader. At least one loader mandrel in the spool magazine receives full spools and transfers the full spools to the creel of the fiber placement machine.

12 Claims, 8 Drawing Sheets

FIBER PLACEMENT AUTO SPOOL LOADER

REFERENCE TO RELATED APPLICATION

This application claims the benefit of U.S. Provisional Application No. 61/446,574, filed Feb. 25, 2011, the entire contents of which are hereby incorporated by reference.

FIELD OF THE DEVICE

The device relates to a method and apparatus for loading spools of fiber into a creel of a fiber placement machine.

BACKGROUND

Fiber placement machines for fabricating large composite structures are known in the art. During the molding operation material is supplied from a creel and placed by the fiber placement head into a mold. When the spools of material in the creel run out, the empty cores have to be removed from the creel and replaced with full spools. A typical creel may comprise thirty-two or more spools and the replacement of the empty spools with full spools is a time consuming process. It would be desirable to mechanize the spool replenishment process for the creels on a fiber placement machine to increase the efficiency of the machine.

SUMMARY

A robot is used to load a spool magazine in a creel loader while a fiber placement machine is charging a mold. When the spools in the creel of the machine need replenishing, the creel loader approaches the creel of the machine and the spool magazine is moved into proximity with the creel. The spool magazine removes the empty spool cores from the creel of the fiber placement machine and replaces the cores with full spools from the spool magazine of the creel loader.

DETAILED DESCRIPTION OF THE DEVICE

Figure 1:
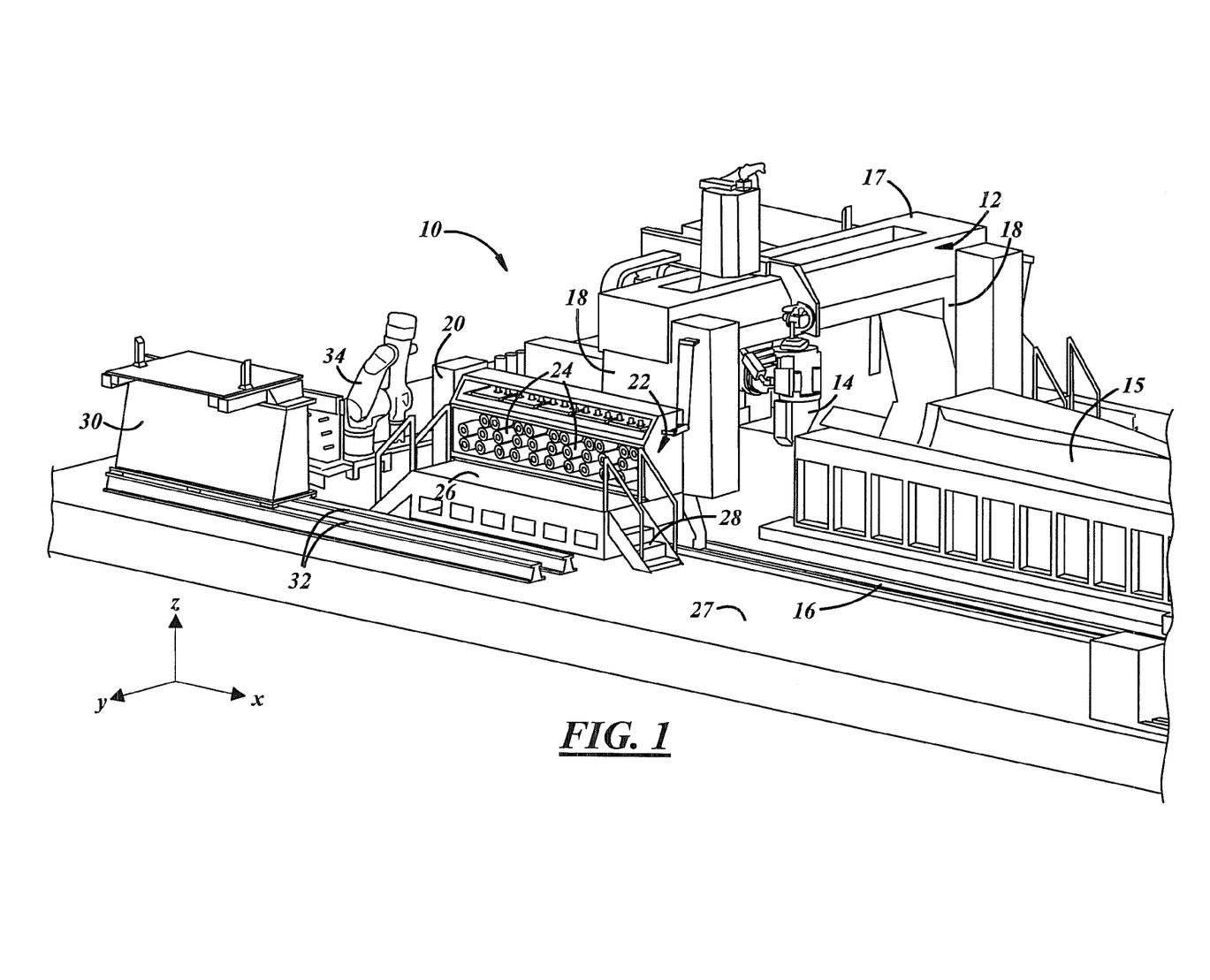
FIG. 1 shows a gantry type fiber placement machine positioned at one end of a fiber placement mold.

FIG. 1 shows one end of a gantry type fiber placement machine 10. The machine 10 comprises a moveable gantry 12 that supports a fiber placement head 14 that is used to apply composite material to a mold 15 which is positioned in front of the gantry 12. The terms fiber and fiber placement head are used generically herein to mean dry fiber or fiber with prepreg resin or slit tape, or heads that are used to place such fiber in a mold or tool in a composite molding process. The gantry 12 is mounted on rails 16 that extend in the direction of the X-axis so that as fiber composite materials are placed in the mold, the gantry machine 10 may move along the length of the mold 15 to apply composite material to the entire mold surface. The horizontal beam 17 of the gantry machine 10 is supported by two vertical upright portions 18. The fiber placement head 14 is moveably supported by the horizontal beam 17 and is moveable back and forth in the direction of the Y-axis between the two vertical upright portions 18 of the gantry and also up and down vertically in the direction of the Z-axis to accommodate different mold heights. The operation of the fiber placement machine is governed by a controller 20.

A creel 22 for supporting a plurality of spools 24 of fiber material is positioned next to the vertical upright portion 18 of the gantry machine. Although some of the drawing figures show that the fiber placement machine is supplied with fiber by two creels, the description below is given in terms of one creel. The creel 22 holds a number of spools 24 of fiber that are fed to the fiber placement head 14 through a fiber delivery mechanism as well known in the art. The creel 22 is attached to the vertical upright portion 18 of the gantry 12 and travels with the gantry as the machine travels on the rails 16 along the length of the mold 15. An operator's platform 26 is positioned next to the creel 22. The operator's platform 26 allows an operator to take a position next to the spools 24 in order to initially feed the end of the fiber from freshly loaded spools into the fiber delivery mechanism. The operator's platform 26 is reached from the factory floor 27 by means of stairs 28 located on either end. A creel loader 30 is mounted on rails 32 behind the operator platform 26. The rails 32 extend from a position that is next to the creel 22 to a position which is next to a robot 34.

Figure 2:
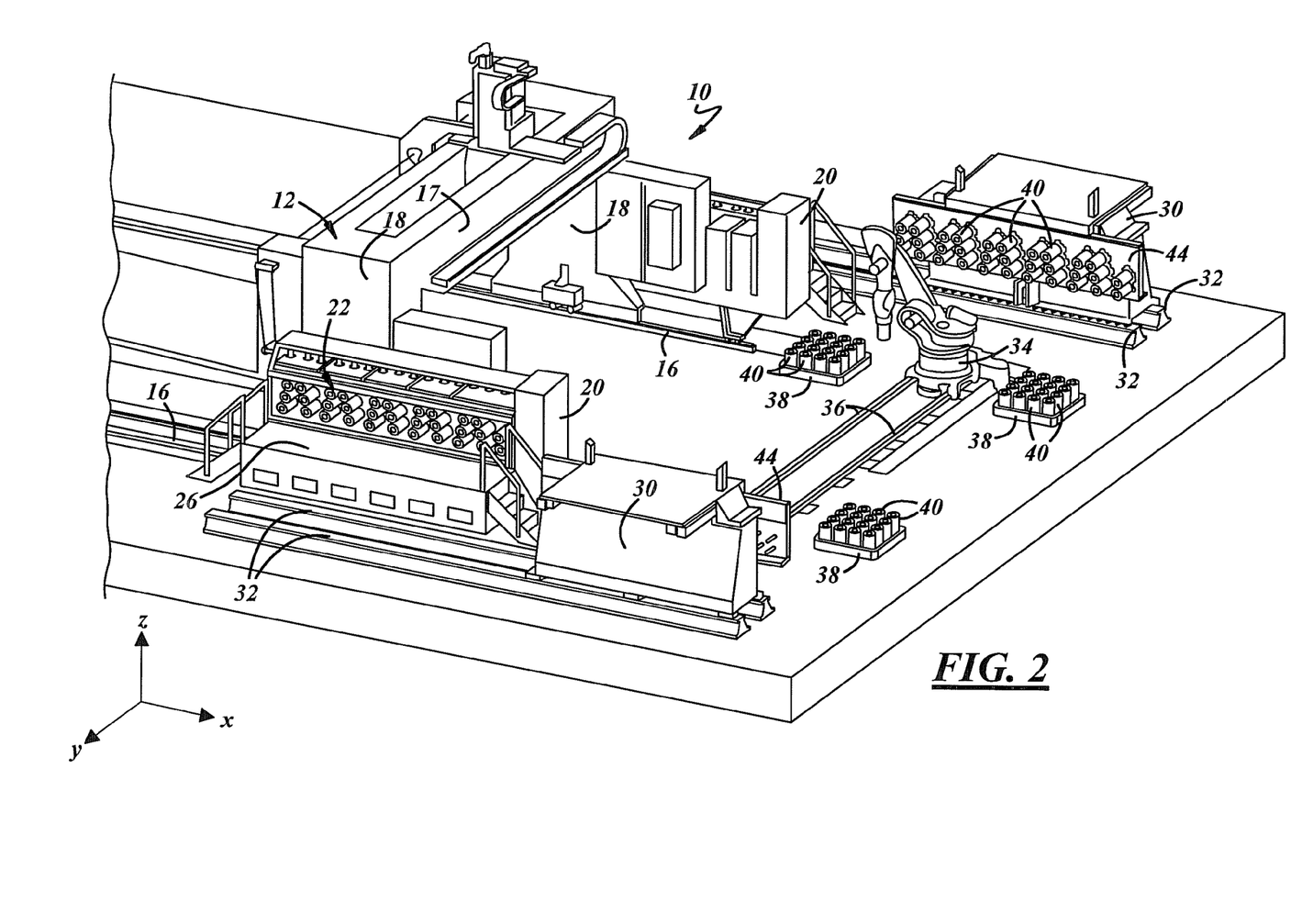
FIG. 2 shows a robot and a pair of creel loaders in a robot load position at the end of a fiber placement mold.

FIG. 2 shows the rear of the fiber placement machine 10 and a pair of creel loaders 30 located on either side of the machine in a robot load position. Each creel loader 30 is mounted on rails 32 so that it may move from the position shown to a creel docking position that is next to the operator platform 26 and the creel 22. A robot 34 is positioned between the two creel loaders 30. The robot 34 is mounted on rails 36 or other guiding mechanism and is able to travel back and forth between the two creel loaders 30. Pallets 38 of full spools 40 of fiber material are positioned on either end of the robot rails 36 in relative proximity to the creel loaders 30. Each creel loader 30 includes a spool magazine 44 that is able to hold a plurality of spools of fiber material. The robot 34 is able to pick up full spools 40 from a pallet 38 and place them onto empty mandrels in the spool magazines 44.

Figure 3:
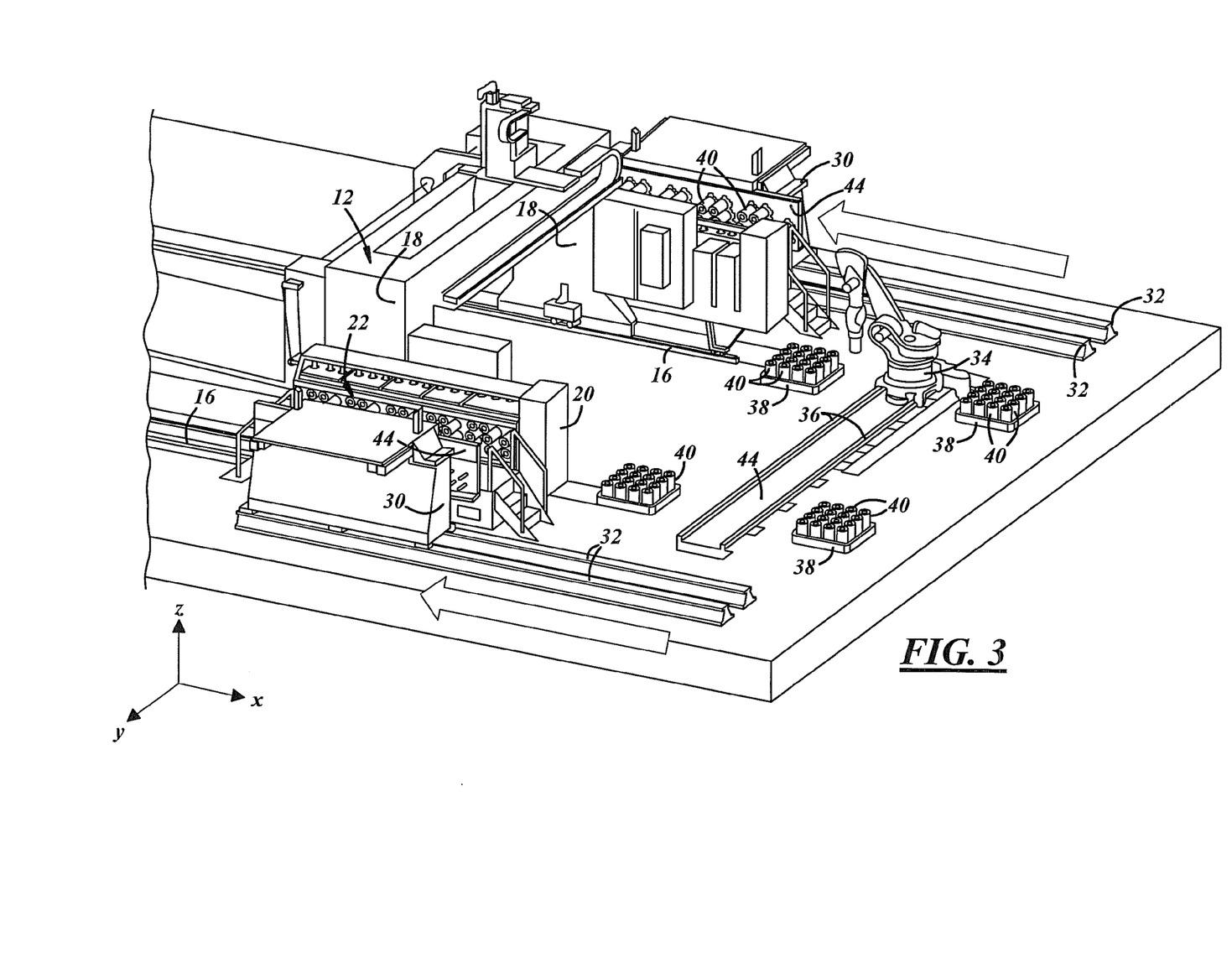
FIG. 3 shows the creel loaders moved to a creel docking position that is opposite the creels of the fiber placement machine.

FIG. 3 shows each creel loader 30 moved along the X-axis into a creel docking position that is opposite the creel 22. The spool magazine 44 in the creel loader 30 is able to transfer full spools 40 to the creel 22 when the creel loader 30 is in the spool transfer position as described below. The number of full spools 40 that may be carried by the spool magazine 44 may be equal to the number of spools that may be loaded into the creel 22.

Figure 4:
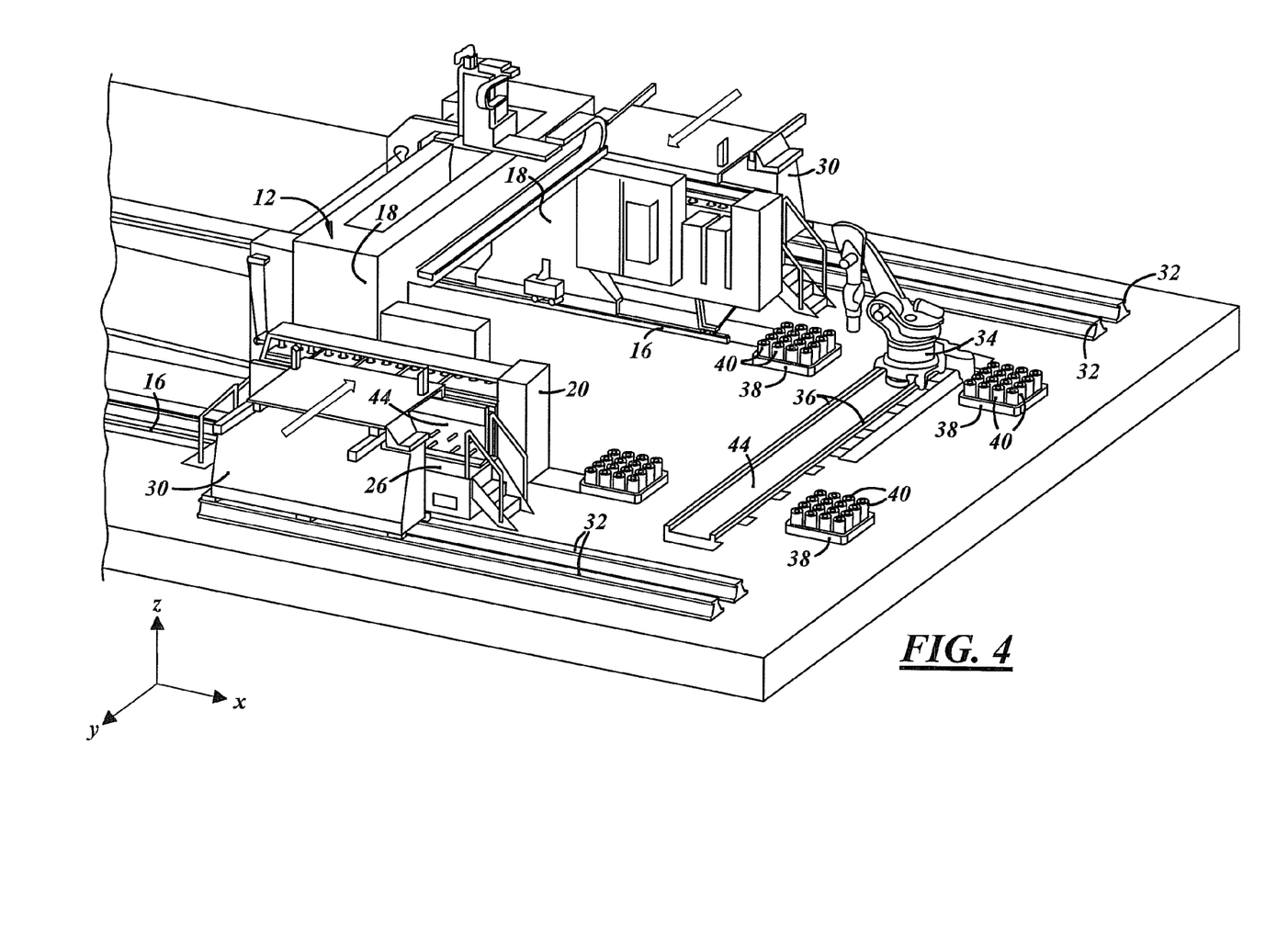
FIG. 4 shows the spool magazines of the creel loaders moved to a spool transfer position where spools of fiber can be transferred from the magazines to the creels.

FIG. 4 shows the spool magazine 44 of the creel loader 30 moved in the direction of the Y-axis across the operator platform 26 and toward the creel 22 to a spool transfer position. In the spool transfer position and as best seen in FIGS. 6-11, empty spools or cores 82 in the creel 22 may be transferred to the spool magazine 44 and full spools 40 in the spool magazines may be loaded into the creels. This motion of the spool magazine 44 toward the creel 22 is perpendicular to the motion of the creel loader 30 when it moves from robot load position next to the robot 34 to the creel docking position shown in FIG. 3. After the empty spools or cores 82 in the creel have been transferred to the spool magazine 44 and full spools 40 in the spool magazine have been loaded into the creels 22, the spool magazine 44 moves along the Y-axis away from the spool transfer position back to a retracted position in the creel loader 30 as shown in FIG. 3. The advance and retract motion of the spool magazine 44 is required in order to allow the spools 40 from the magazine loader to move across the operator platform 26 into proximity to the creels 22 and to place the full spools 40 in the spool magazine 44 in a transfer position relative to creels 22.

Figure 5:
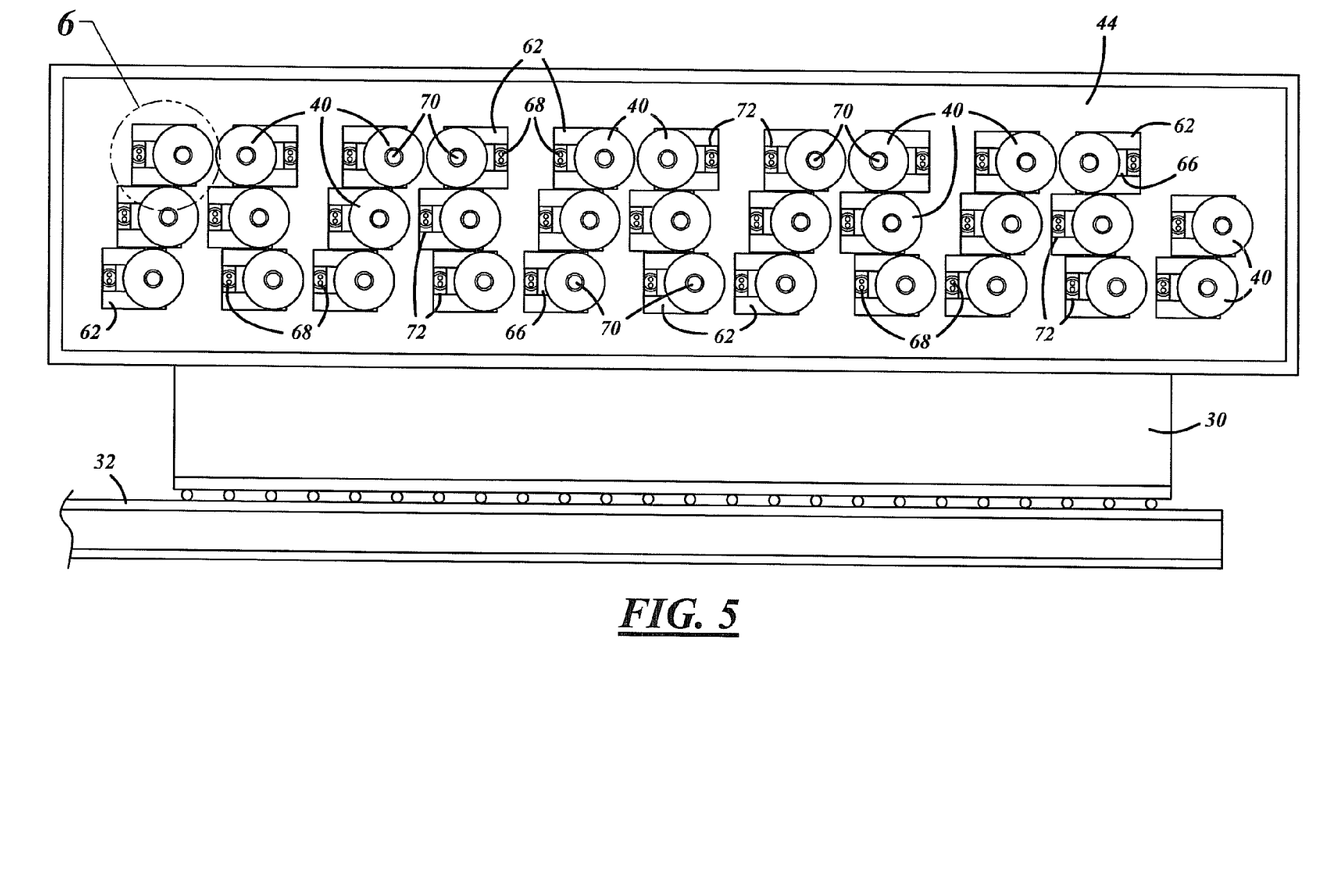
FIG. 5 is a front view of a spool magazine.

FIG. 5 is a front view of a spool magazine 44. In one embodiment, the spool magazine 44 contains thirty-two turret mechanisms 50. Each turret mechanism 50 is shown with an empty stripper mandrel 68 and a full spool 40 on a loader mandrel 70 as explained in greater detail below. The pattern of the full spools 40 in the spool magazine 44 matches the pattern of the mandrels in the creel 22. This allows all of the spools 40 in the spool magazine 44 to be loaded into the creel 22 at the same time. Through the use of the device, the spool magazine 44 is able to engage the creel 22, remove the empty cores from the creel, and load thirty two full spools into the creels 22 in five to ten minutes time. Although the spool magazine 44 is shown with thirty-two spools for use with a thirty-two spool creel, spool magazines and creels with other numbers of spools may be employed without departing from the spirit of the present device. A spool magazine having only six spools for use with a creel having more than six spools is also possible. With such an arrangement, the spool magazine 44 has to be loaded by the robot 34 multiple times in order to replenish the entire creel with full spools once.

Figure 6:
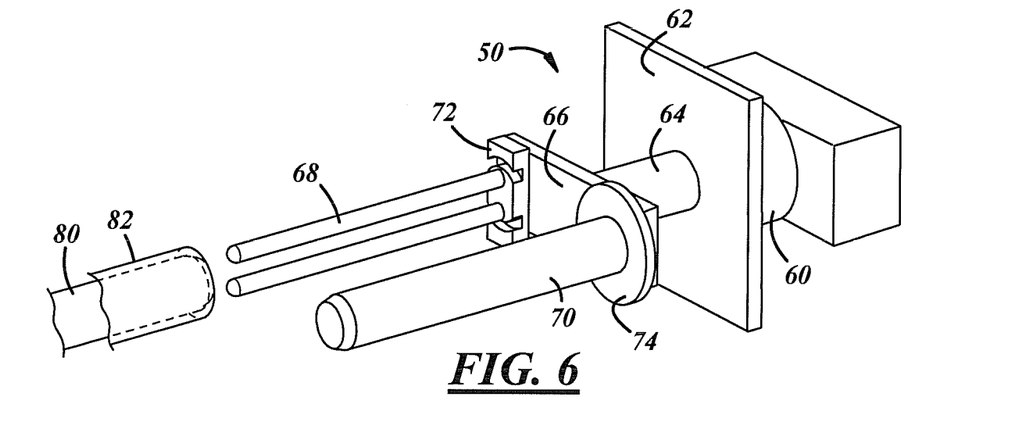
FIG. 6 is a perspective view of one of the turret mechanisms shown on the spool magazine of FIG. 5.

FIG. 6 is a perspective view of one of the turret mechanisms 50 that is used to remove empty cores from the creel 22 and load full spools onto the creel. The turret mechanisms 50 are mounted in the spool magazine 44. Typically the spool magazine 44 has one turret mechanism 50 for every spool that is mounted in the creel. Each turret mechanism 50 comprises a rotary actuator 60 and a mounting plate 62. An actuator shaft 64 coupled to the rotary actuator 60 extends through the mounting plate 62 from the rotary actuator, and a loader arm 66 is mounted on the end of the actuator shaft 64. A stripper mandrel 68 is mounted on one end of the loader arm 66, and a loader mandrel 70 is mounted on the opposite end of the loader arm. A core gripper 72 is mounted on the stripper mandrel 68. The core gripper 72 is shown in the retracted position on the stripper mandrel 68. A spool pusher 74 is mounted on the loader mandrel 70. The spool pusher 74 is shown in the retracted position on the loader mandrel 70 corresponding to the position of the pusher when a full spool is mounted on the loader mandrel. A creel mandrel 80 is opposite the stripper mandrel 68 and an empty core 82 is on the creel mandrel 80.

Figure 7:
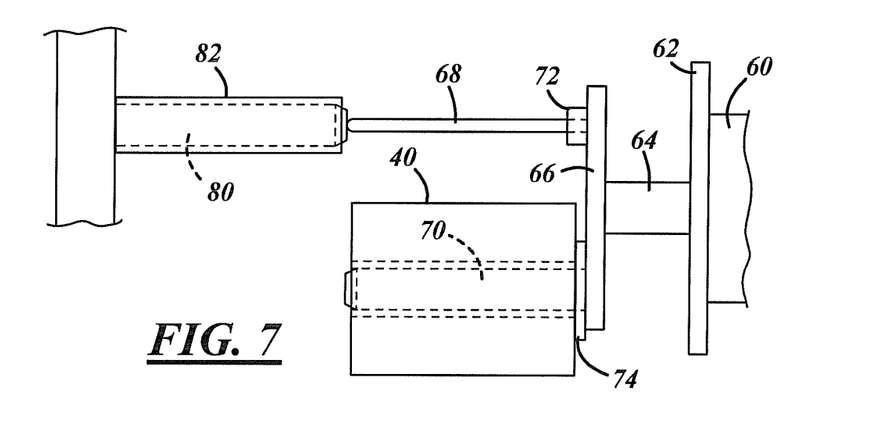
FIG. 7 is an overhead view showing a turret mechanism positioned opposite a mandrel in the creel.

FIGS. 7-11 show the steps by which empty spools or cores are removed from the creel and replaced with a full spool by the turret mechanism 50. FIG. 7 is an overhead view showing a turret mechanism 50 positioned opposite a mandrel 80 mounted in the creel. An empty core 82 is on the creel mandrel 80. A full spool 40 is mounted on the loader mandrel 70 and a core gripper 72 is in a retracted position on the stripper mandrel 68. The core gripper 72 is slideably mounted on the stripper mandrel 68 and is configured to grip the end of an empty spool core 82 from which all of the fiber material has been unwound.

Figure 8:
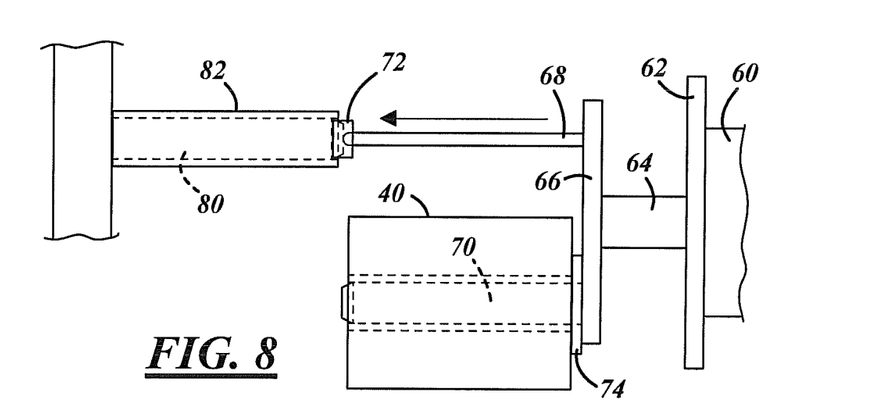
FIG. 8 is an overhead view showing the core gripper of the turret mechanism advanced to grip a core from the creel.

FIG. 8 shows the gripper mechanism 72 in an extended position on the stripper mandrel 68 in order to grip the empty spool core 82 from the mandrel 80 in the creel 22.

Figure 9:
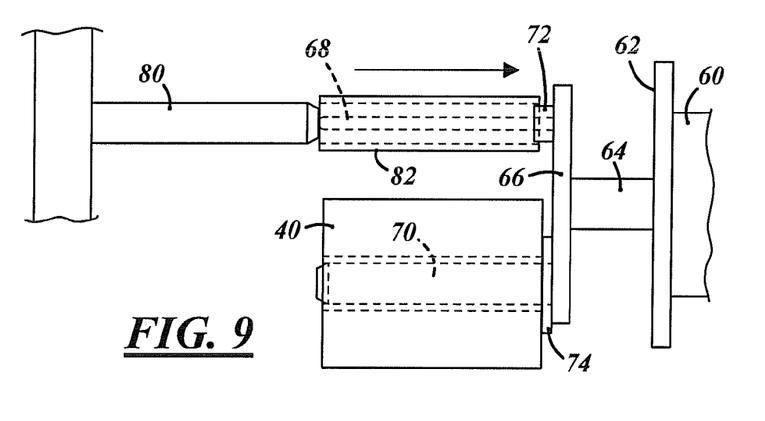
FIG. 9 is an overhead view showing the core gripper of the turret mechanism removing a core from the creel.

FIG. 9 shows the gripper mechanism 72 with the empty spool core 82 moved to the retracted position on the stripper mandrel 68.

Figure 10:
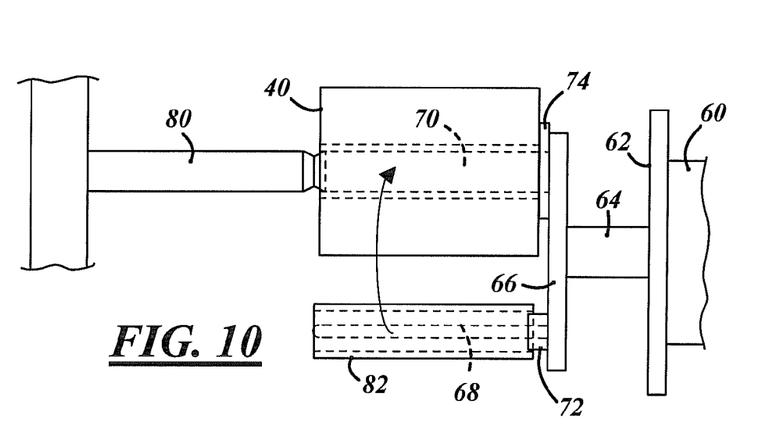
FIG. 10 is an overhead view the turret mechanism rotated 180 degrees to position a full spool opposite the empty mandrel in the creel.

FIG. 10 shows the loader arm 66 rotated 180° to move a full spool 40 on the loader mandrel 70 to the position that was formerly occupied by the stripper mandrel 68. This places the full spool 40 in alignment with the empty mandrel 80 in the creel.

Figure 11:
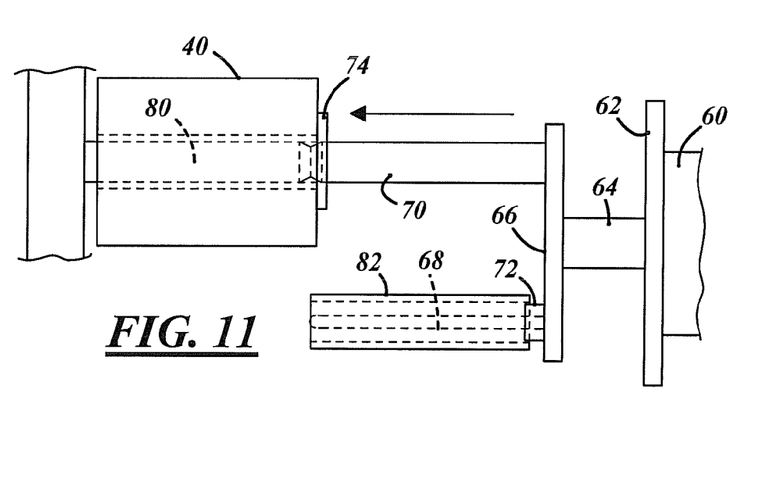
FIG. 11 is an overhead view showing a full spool loaded onto the empty mandrel in the creel.

FIG. 11 shows the full spool 40 slid off of the loader mandrel 70 by the spool pusher 74 and onto the empty mandrel 80 in the creel.

Figure 12:
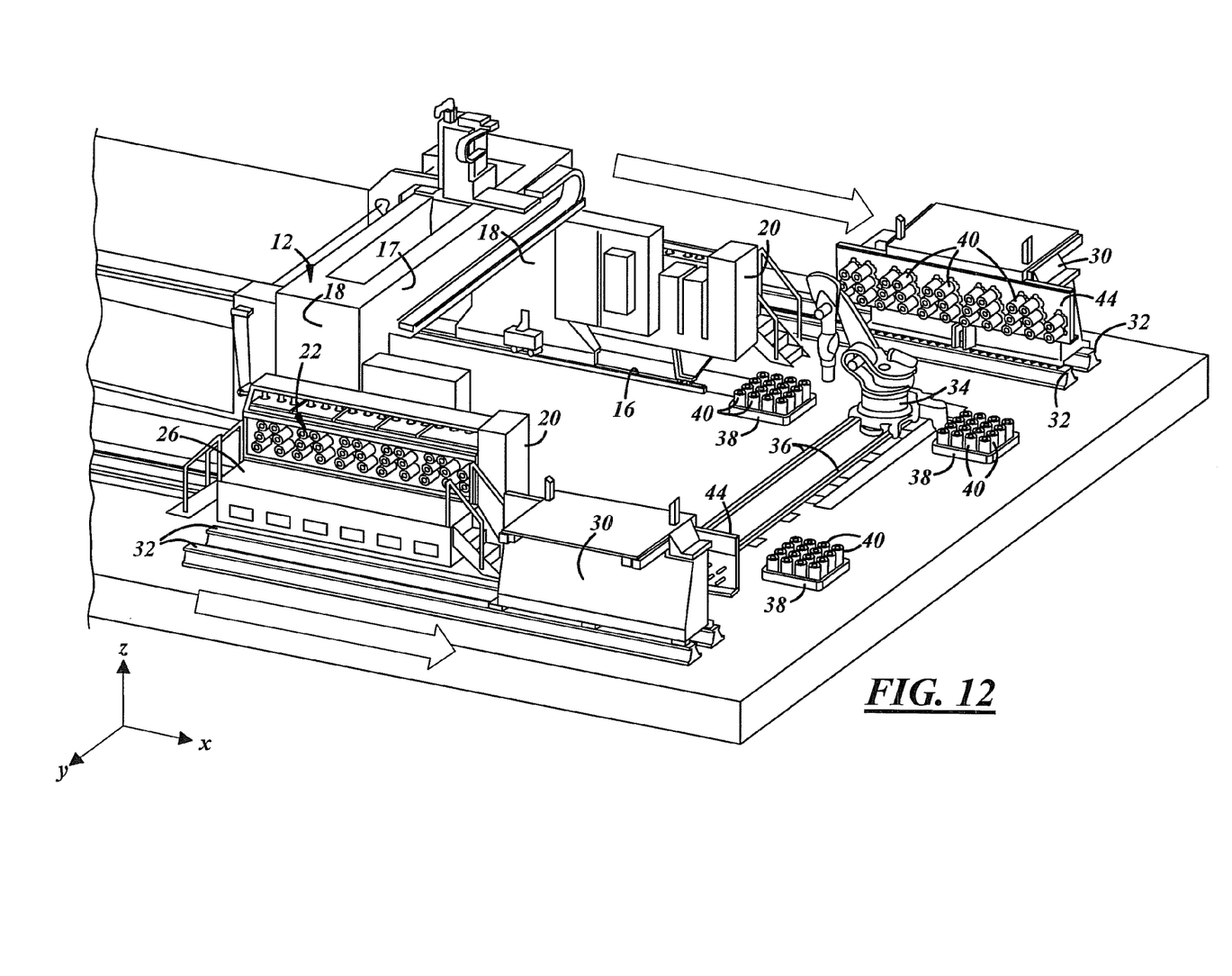
FIG. 12 shows the creel loaders moved back to the robot loading position.

FIG. 12 shows the spool magazines 44 in a retracted position in the creel loaders 30 and the creel loaders moved along the X-axis back into the robot load position next to the robot 34.

In operation, the gantry 12 supports the fiber placement head 14 as the head places fiber material into the mold 15. The gantry 12 allows the head 14 to move from side to side along the Y-axis and up and down along the Z-axis as required by the configuration of the mold 15. The gantry 12 also travels along the X-axis on the rails 16 that are positioned on either side of the mold 15 in order to apply fiber to the full length of the mold. As the gantry 10 moves down the length of the mold 15, the creels 22 move with the gantry. The operator platforms 26 remain in place and do not move with the creels 22. When the spools 40 in the creels become depleted, the gantry 12 comes to rest at the end of the mold 15 where spool transfer can take place. If the two creels 22 each hold 32 spools and each of the creel loaders hold 32 spools, all of the empty spool cores 82 may be removed from the creels 22 at the same time and all of the full spools 40 from the spool magazines 44 may be loaded into the creels 22 at the same time. After the creel 22 has been loaded with fresh spools 40, the spool magazines 44 retract from the creels and the creel loaders 30 return to the robot load position. If the creel loaders hold fewer spools than the number of spools held by the creels, the loading process may be performed multiple times in order to fully charge the creel with full spools. While the fiber placement machine is charging the mold 15, the robot 34 is used to remove empty cores 82 from the stripper mandrels 68 of the magazine loaders and to load full spools 40 onto the loader mandrels 70.

Having thus described the invention, various alterations and modifications and alterations will be apparent to those skilled in the art, which alterations and modifications are intended to be within the scope of the invention as defined by the appended claims.

We claim:

1. An apparatus for loading spools into a creel of a fiber placement machine that is used to charge a mold, the creel having a number of spools arranged in a pattern, the apparatus comprising:

a creel loader;

a spool magazine carried by the creel loader;

at least two mandrels in the spool magazine, a stripper mandrel and a loader mandrel, whereby the stripper mandrel is used to remove an empty spool core from the creel and the loader mandrel is used to load a full spool into the creel;

at least one mandrel in the spool magazine for receiving full spools and for transferring the full spools to the creel of the fiber placement machine, wherein the at least one mandrel is the loader mandrel; and, a turret mechanism for mounting the stripper mandrel and the loader mandrel in the spool magazine, the turret mechanism aligning first the stripper mandrel with a selected mandrel in the creel to remove an empty spool from the creel and then aligning the loader mandrel with the selected mandrel to load a full spool into the creel.

2. The apparatus of claim 1 further comprising:
a robot loader position and a spool transfer position for the creel loader, whereby the spool magazine may be loaded with spools at the robot loader position while the fiber placement machine is charging a mold.

3. The apparatus of claim 2 further comprising:
a robot for loading spools into the magazine, whereby the robot places full spools into the magazine with the magazine in the robot load position and the full spools are transferred to the creel with the creel loader in the spool transfer position.

4. The apparatus of claim 3 further comprising:
two creels for the fiber placement machine and two creel loaders; and,
a spool magazine in each creel loader, wherein the robot is able to move between the two creel loaders in order to load full spools into the two spool magazines in the two creel loaders.

5. The apparatus of claim 1 further comprising:
a rotary actuator for the turret mechanism, the rotary actuator aligning first the stripper mandrel with a selected mandrel in the creel and then the loader mandrel with the same selected mandrel in the creel.

6. The apparatus of claim 1 further comprising:
a plurality of turret mechanisms in the spool magazine, the turret mechanisms being arranged in a pattern that is the same as the pattern of spools in the creel, whereby all of the spools in the creel can be removed from the creel at the same time.

7. A method for loading spools into a creel of a fiber placement machine that is used to charge a mold, the method comprising:
providing a creel loader;
providing a spool magazine in the creel loader;
providing at least one loader mandrel in the spool magazine;
loading full spools onto the loader mandrel;
transferring the full spools from the loader mandrel to the creel of the fiber placement machine;
mounting a stripper mandrel and a loader mandrel on a turret mechanism on the spool magazine;
providing a rotary actuator for the turret mechanism;
first aligning the stripper mandrel with a preselected mandrel in the creel; and,
then rotating the stripper mandrel and the loader mandrel to align the loader mandrel with the same preselected mandrel in the creel.

8. The method of claim 7 further comprising:
loading full spools into the spool magazine in a robot loader position; and,
transferring full spools from the spool magazine to the creel in a spool transfer position, whereby the spool magazine may be loaded with spools while the fiber placement machine is charging a mold.

9. The method of claim 8 further comprising:
providing a robot for loading full spools into the magazine;
placing full spools into the spool magazine with the spool magazine in the robot load position; and,
transferring the full spools from the spool magazine to the creel with the spool magazine in the spool transfer position.

10. The method of claim 9 further comprising:
providing two creels for the fiber placement machine;
providing two creel loaders;
providing a spool magazine in each creel loader; and,
moving the robot between the two creel loaders in order to load full spools into the two spool magazines.

11. The method of claim 9 further comprising:
providing a core gripper on the stripper mandrel; and
removing empty cores from the creel with the core gripper.

12. The method of claim 11 further comprising:
loading full spools onto the loader mandrel; and
transferring the full spools from the loader mandrel to the creel.

* * * * *